US007204431B2

(12) United States Patent
Li et al.

(10) Patent No.: US 7,204,431 B2
(45) Date of Patent: Apr. 17, 2007

(54) ELECTROSPRAY ION SOURCE FOR MASS SPECTROSCOPY

(75) Inventors: Ganggiang Li, Palo Alto, CA (US); Paul C. Goodley, Cupertino, CA (US); Hongfeng Yin, Cupertino, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 314 days.

(21) Appl. No.: 10/699,448

(22) Filed: Oct. 31, 2003

(65) Prior Publication Data

US 2005/0092855 A1 May 5, 2005

(51) Int. Cl.
*A01G 23/10* (2006.01)

(52) U.S. Cl. ....................... 239/3; 239/690; 239/690.1; 239/706; 239/707; 250/288; 250/281

(58) Field of Classification Search ................ 239/690, 239/690.1, 706, 707, 3; 250/288, 287, 281, 250/282
See application file for complete search history.

(56) References Cited

U.S. PATENT DOCUMENTS

| | | | | |
|---|---|---|---|---|
| 5,349,186 | A * | 9/1994 | Ikonomou et al. | 250/288 |
| 5,485,016 | A * | 1/1996 | Irie et al. | 250/288 |
| 5,750,988 | A * | 5/1998 | Apffel et al. | 250/288 |
| 6,541,767 | B1 | 4/2003 | Kato | |
| 6,653,626 | B2 * | 11/2003 | Fischer et al. | 250/288 |
| 2004/0079881 | A1 | 4/2004 | Fischer et al. | |

FOREIGN PATENT DOCUMENTS

| | | | |
|---|---|---|---|
| EP | 0 966 022 | A3 | 1/2002 |
| EP | 1 507 282 | A2 | 10/2004 |
| GB | 2 308 227 | A | 6/1997 |

* cited by examiner

*Primary Examiner*—Dinh Q. Nguyen

(57) ABSTRACT

The invention provides an electrospray apparatus with an auxiliary electrode, and a method of using.

25 Claims, 4 Drawing Sheets

ELECTROSPRAY ION SOURCE FOR MASS SPECTROSCOPY

FIELD OF THE INVENTION

The invention relates generally to electrospray ionization of a sample to be analyzed. The invention is generally useful in providing an ion source for an analyzer such as a mass spectrometer.

BACKGROUND OF THE INVENTION

Electrospray ionization refers to a method of providing ionized molecules from a liquid sample. The electrospray ionization process generates highly-charged droplets from the liquid sample. As solvent evaporates from the droplets, gas phase ions representative of the species contained in the liquid sample are generated. The ions are then introduced into an analyzer (e.g. a mass spectrometer) via an ion-sampling interface coupled to the analyzer. FIGS. 1A and 1B illustrate examples of a conventional electrospray ion source 102*a* and an orthogonal electrospray ion source 102*b*, respectively. In FIG. 1A, the conventional electrospray ion source 102*a* has a spray needle 104 directed generally towards an inlet 112 of an ion-sampling interface 106. The ion-sampling interface 106 includes a housing 108 defining a lumen 110 wherein the lumen 110 is operable to transport a drying gas 114 past the inlet 112 of the ion-sampling interface 106.

In operation, an electrospray is produced when a sufficient electrical potential difference $V_{inlet}$ is applied between the inlet 112 of the ion-sampling interface 106 and the fluid at the tip of the spray needle 104 to generate a concentration of electric field lines emanating from the tip of the spray needle 104. When a positive voltage $V_{inlet}$ is applied at the inlet 112 of the ion-sampling interface 106 relative to the tip of the spray needle 104, the electric field causes negatively-charged ions in the fluid to migrate to the surface of the fluid at the tip of the spray needle 104. Conversely, a negative voltage $V_{inlet}$ applied at the inlet 112 of the ion-sampling interface 106 relative to the tip of the spray needle 104 will result in positively-charged ions in the fluid migrating to the surface of the fluid at the tip of the spray needle 104. Once the ions are at the surface of the fluid, small charged droplets 116 under the influence of the electric field are urged by electrostatic forces towards the inlet 112 of the ion-sampling interface 106. Solvent rapidly evaporates from the droplets 116, leaving ions 118 from the analyte drawn to and through the inlet 112 of the ion-sampling interface 106 and into the passage of the ion guide. The ions 118 typically are delivered from the ion-sampling interface 106 to a mass spectrometer for analysis.

Conventional electrospray ion sources, such as shown in FIG. 1A, tend to have difficulty with solvent droplets making their way into the vacuum system because the electro-sprayed aerosol (droplets 116) exiting from the tip of the spray needle 104 is sprayed directly towards the inlet 112 of the ion-sampling orifice 106. That is, the electrosprayed aerosol 116 exiting from the spray needle 104 and the entry into the vacuum system are located along a common central axis, with the spray needle effluent pointing directly at the entry into the vacuum system and with the spray needle being considered to be located at an angle of zero (0) degrees relative to the common central axis.

In an orthogonal electrospray ion source 102*b*, such as shown in FIG. 1B, the spray needle 104 is reoriented to a transverse relationship with respect to the ion-sampling interface 106. The transverse orientation allows more efficient enrichment of the analyte ions 118 by spraying the charged droplets 116 in the electrosprayed aerosol past the ion-sampling interface 106, while directing the solvent vapor and solvated droplets 116 in the electrosprayed aerosol away from the ion-sampling interface 106 so that they do not enter the vacuum system.

Although the orthogonal design works well, further improvements are sought.

SUMMARY OF THE INVENTION

The invention addresses the aforementioned deficiencies in the art, and provides novel electrospray apparatus and methods. In an embodiment in accordance with the invention, an electrospray apparatus includes a nozzle defining an exit orifice, an entrance orifice, and a first passage extending from the entrance orifice to the exit orifice, the nozzle defining a nozzle axis. The electrospray apparatus further includes an interface defining an inlet, an outlet, and a second passage extending from the inlet to the outlet, the interface defining an interface axis. The interface is disposed such that the inlet is adjacent the exit orifice and the interface axis is in transverse relation to the nozzle axis; wherein an angle formed between the nozzle axis and the interface axis is between about 75 degrees and about 105 degrees. The interface is operable to receive a voltage from an interface voltage source. An auxiliary electrode disposed in operable relation to the exit orifice is operable to receive a voltage from an auxiliary voltage source, and is also operable to modulate an electric field at the exit orifice. The electrospray apparatus is operable to define an ion pathway followed by ions enroute from the exit orifice to the inlet, and the auxiliary electrode is disposed outside the ion pathway.

In an embodiment the interface comprises a housing defining an opening disposed adjacent the inlet, wherein the housing defines a lumen for transporting a gas, the lumen in fluid communication with the opening.

In some embodiments, the auxiliary electrode is disposed such that an angle of less than 15 degrees is subtended between the auxiliary electrode and the interface axis, said angle having its vertex at the inlet. In other embodiments, the auxiliary electrode is disposed such that an angle of less than 15 degrees is subtended between the auxiliary electrode and the nozzle axis, said angle having its vertex at the exit orifice.

The auxiliary electrode in some embodiments is a disk electrode; in other embodiments, the auxiliary electrode is a pin electrode; and in still other embodiments, the auxiliary electrode is an 'L' shaped electrode. In yet another embodiment, the auxiliary electrode has a convex cylindrical surface having a central axis, the central axis parallel to the nozzle axis.

The invention further provides a method of converting a liquid solute sample into ionized molecules. The method includes introducing a liquid solute sample into an apparatus according to the invention and applying an interface voltage to the interface and an auxiliary voltage to the auxiliary electrode. The applied interface voltage and auxiliary voltage are sufficient to subject the sample at the exit orifice and the inlet to an electric field, whereby the sample is discharged from the exit orifice in the form of droplets, the electric field effective to produce ionized molecules from the droplets and urge the ionized molecules towards the inlet. In particular embodiments, the method further includes applying a housing potential to the housing.

Additional objects, advantages, and novel features of this invention shall be set forth in part in the descriptions and examples that follow and in part will become apparent to those skilled in the art upon examination of the following specifications or may be learned by the practice of the invention. The objects and advantages of the invention may be realized and attained by means of the instruments, combinations, compositions and methods particularly pointed out in the appended claims.

BRIEF DESCRIPTION OF THE DRAWINGS

These and other features of the invention will be understood from the description of representative embodiments of the method herein and the disclosure of illustrative apparatus for carrying out the method, taken together with the Figures, wherein FIG. 1A and FIG. 1B schematically illustrate a conventional electrospray ion source and an orthogonal electrospray ion source, respectively

To facilitate understanding, identical reference numerals have been used, where practical, to designate corresponding elements that are common to the Figures. Figure components are not drawn to scale.

DETAILED DESCRIPTION

Before the invention is described in detail, it is to be understood that unless otherwise indicated this invention is not limited to particular materials, reagents, reaction materials, manufacturing processes, or the like, as such may vary. It is also to be understood that the terminology used herein is for purposes of describing particular embodiments only, and is not intended to be limiting. It is also possible in the present invention that steps may be executed in different sequence where this is logically possible. However, the sequence described below is preferred.

It must be noted that, as used in the specification and the appended claims, the singular forms "a," "an" and "the" include plural referents unless the context clearly dictates otherwise. Thus, for example, reference to "an insoluble support" includes a plurality of insoluble supports. In this specification and in the claims that follow, reference will be made to a number of terms that shall be defined to have the following meanings unless a contrary intention is apparent.

For purposes of describing spatial relationships in embodiments of the application, the following are defined:

An ion pathway is defined as the path followed by ions enroute from the exit orifice to the inlet during normal operation of the electrospray apparatus according to the current invention. It should be noted that the ion pathway is still defined for the apparatus even if no ions are actively being generated (e.g. the apparatus is turned off).

"Upstream" and "downstream" as used herein refer to the typical flow of an ion through an apparatus in accordance with the present invention. The ion starts at the entrance orifice (as an as-yet-un-ionized species in solution), passing through the first passage to the exit orifice, it passes into an electrosprayed droplet which evaporates to result in the de-solvated ion urged toward the inlet, through the second passage to the outlet. Upstream references a location relatively earlier in the ion's journey (or in the same general direction), and downstream references a location later in the ion's journey (or in the same general direction).

A nozzle axis is the center axis of the nozzle.

A nozzle plane is a plane that is perpendicular to the nozzle axis and intersects the nozzle axis at the exit orifice.

An interface axis is the center axis of the interface.

An interface plane is a plane that is perpendicular to the interface axis and intersects the interface axis at the inlet.

Transverse, as used to describe a spatial relationship between two items (e.g. two axes), indicates that the two items are oriented in a generally crosswise orientation. The items need not cross at right angles to be in transverse relation, but in particular embodiments, the two items cross at an angle of greater than about 45 degrees and less than about 135 degrees, and in more typical embodiments, the angle is greater than about 75 degrees and less than about 105 degrees.

Figure 1A:
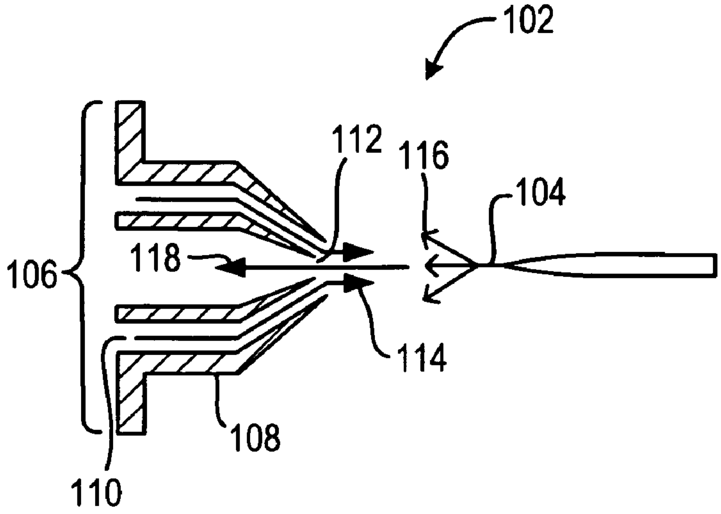
Figure 1B:
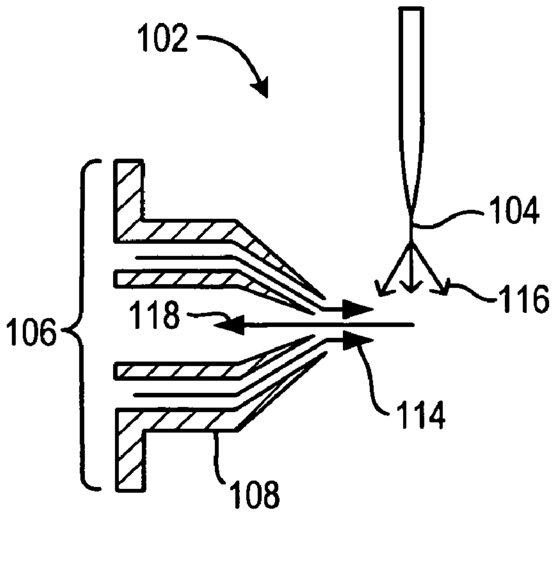
Figure 2:
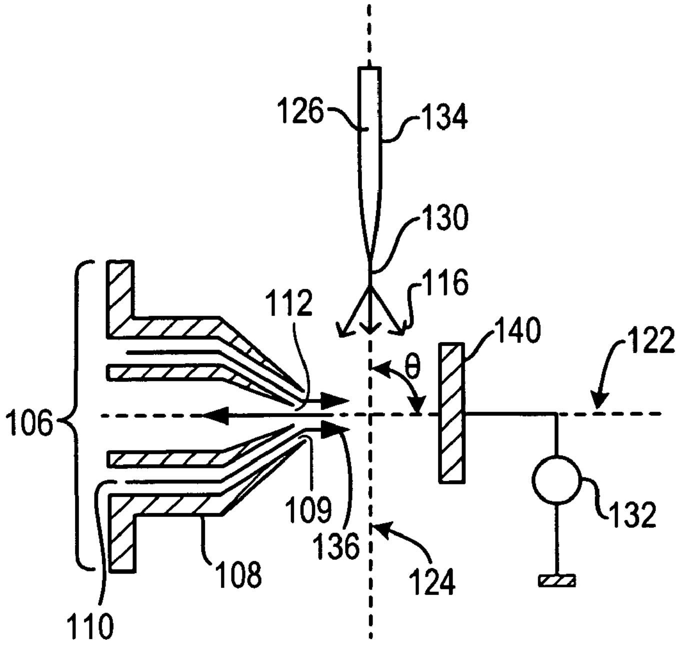
FIG. 2 depicts an embodiment according to the invention.

As shown in FIG. 2, the interface axis 122 and the nozzle axis 124 are in a transverse relationship and define an angle where they cross each other. This angle Θ (theta) defines the location of the first passage 126, that is, the nebulizer or other source of electrosprayed aerosol (droplets 116), relative to the second passage 128, that is, the entry into the vacuum system. The angle Θ (theta) is considered to be zero (0) degrees when the exit orifice 130 for the electrosprayed aerosol (droplets 116) and the nozzle axis 124 of the first passage 126 are pointing directly at the inlet 112 and the interface axis 122. The angle Θ (theta) is considered to be 180 degrees when the exit orifice 130 for the electrosprayed aerosol (droplets 116) and the nozzle axis 124 are pointing directly away from the inlet 116 and the interface axis 122.

The term "passage", as used in this application herein with respect to the second passage, means "ion guide" in any form whatsoever. It is possible that the passage is of such short length relative to the opening diameter that it may be called an orifice. Other ion guides, including capillaries, which are or may come to be used, can operate in the invention. The configurations herein are not meant to be restrictive, and those skilled in the art will see possible configurations not specifically mentioned here but which are included in the teaching and claims of this invention. In particular, the voltages mentioned herein are typically measured relative to ground unless specifically mentioned otherwise. The nozzle (or spray needle) is assumed to be connected to ground unless otherwise specifically indicated. One of ordinary skill in the art of mass spectroscopy will realize that the voltages may be measured relative to various other points without altering the basic functionality of the system. Further, it will be readily apparent to the ordinarily skilled practitioner of the art that the apparatus may be operated to yield anions or cations, and the disclosure of operation for one is generally sufficient to describe operation for the other.

Referring now to the Figures, FIG. 2 depicts a typical embodiment of an electrospray ionization source according to the invention. An auxiliary electrode 140 is disposed along the interface axis 122 opposite the inlet 112. The exit orifice 130, is in transverse relation to the interface. In the illustrated embodiment, a voltage source 132 is in operable relation to the auxiliary electrode 140 to provide a potential for the auxiliary electrode. The distances between inlet 112, auxiliary electrode 140 and exit orifice 130 are typically adjustable. In this embodiment, the auxiliary electrode 140 is a flat electrode. The geometrical and electrical dimension of the auxiliary electrode 140 are as follows:

The auxiliary electrode 140 is a conductive circular plate made of, for instance, stainless steel, gold platted steel, brass or other chemically stable surface. The diameter of the plate is about in the same dimension as the inlet 112, for instance 5 to 15 mm and more typically 6 to 10 mm. The thickness of electrode is more or less arbitrary, but typically about 1 mm.

The auxiliary electrode 140 is placed about 4 to 20 mm away from the inlet 112 depending on the size of the nozzle 134. For a nanoliter spray tip, the distance is about 4 to 12 mm and more typically 5 to 10 mm. The nozzle 134 is about in the center of the auxiliary electrode 140 and inlet 112, preferably slightly closer to the inlet 112. For instance, if the distance between the inlet 112 and auxiliary electrode 140 is 7 mm, the distance between the nozzle 134 and the inlet 112 is about 3 mm, or the distance between the nozzle and the auxiliary electrode 140 is 4 mm.

The voltage applied to the auxiliary electrode 140 is about the same as that applied to the inlet 112. The voltage may be more positive or slightly more negative. In case it is more positive, it typically does not exceed 50% of the inlet voltage and in case more negative, not exceed 10%. For instance, for positive ion detection, a voltage of −2000 V is applied to the inlet 112, the voltage applied to the auxiliary electrode 140 will not be higher than −1000 V and not lower than −2200 V. This rule is also applied to the negative ion, but with opposite polarity.

In the embodiment shown in FIG. 2, the interface 106 comprises a housing 108 defining an opening 109 disposed adjacent the inlet 112, wherein the housing 108 defines a lumen 110 for transporting a gas 136, the lumen 110 in fluid communication with the opening 109.

Figure 3:
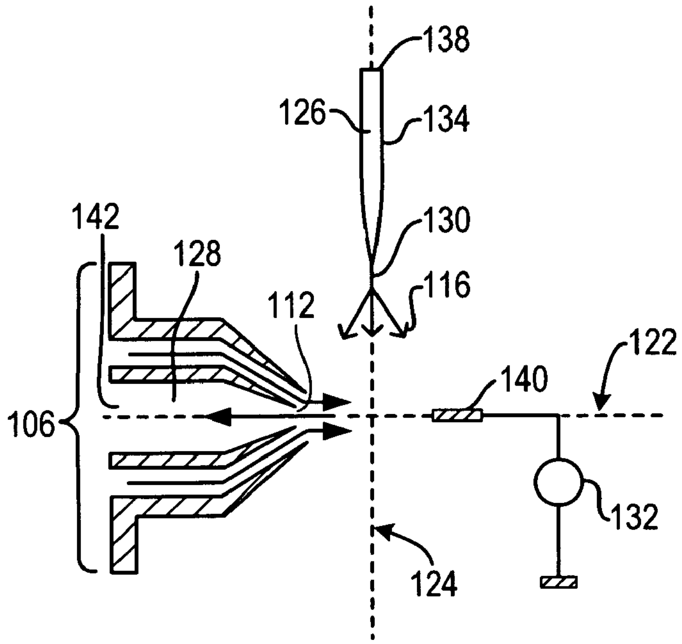
FIG. 3 depicts an embodiment according to the invention.

FIG. 3 shows another embodiment in accordance with the invention, wherein the auxiliary electrode 140 is a pin electrode and is inline with the inlet 112. The diameter of the pin electrode is about the same as the dimension of the tip of the inlet 112, for instance 2 to 5 mm and more typically 3 to 4 mm. The tip of the pin electrode may be tapered. The other geometric and electric dimensions are similar to which of the embodiment in FIG. 2. The embodiment includes a nozzle 134 defining an exit orifice 130, an entrance orifice 138, and a first passage 126 extending from the entrance orifice 138 to the exit orifice 130, the nozzle 134 defining a nozzle axis 124. The electrospray apparatus further includes an interface 106 defining an inlet 112, an outlet 142, and a second passage 128 extending from the inlet 112 to the outlet 142, the interface 106 defining an interface axis 122. The interface 106 is disposed such that the inlet 112 is adjacent the exit orifice 130 and the interface axis 122 is in transverse relation to the nozzle axis 124; wherein an angle formed between the nozzle axis 124 and the interface axis 122 is between about 75 degrees and about 105 degrees. The interface 106 is operable to receive a voltage from an interface voltage source. The auxiliary electrode 140 disposed in operable relation to the exit orifice 130 is operable to receive a voltage from an auxiliary voltage source 132, and is also operable to modulate an electric field at the exit orifice 130. The electrospray apparatus is operable to define an ion pathway followed by ions enroute from the exit orifice 130 to the inlet 112, and the auxiliary electrode 140 is disposed outside the ion pathway.

FURTHER EXAMPLES

Figure 4:
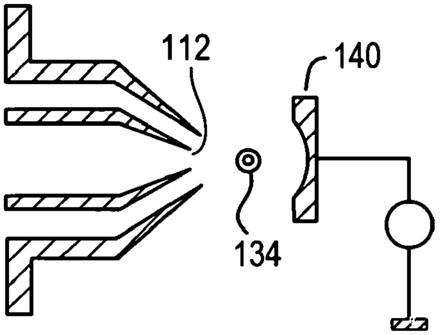
FIG. 4 depicts an embodiment according to the invention.
Figure 5:
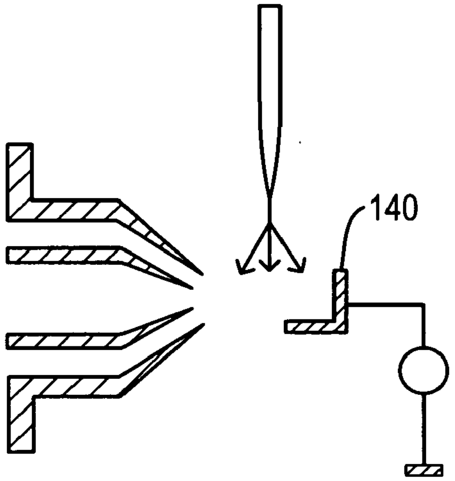
FIG. 5 depicts an embodiment according to the invention.

The auxiliary electrode 140 can be made with various shapes in the proper dimension providing similar or slightly modified electrical fields for electrospray. The electrode of the each shape is optimized in its geometric and electric dimension to obtain optimal spray. In FIG. 4, another embodiment of the auxiliary electrode 140 is provided. The figure shows a perpendicular perspective of the embodiment. The auxiliary electrode 140 has a cylindrical surface 144 faced to the inlet 106 with the axial direction parallel to the nozzle 134. FIG. 5, the auxiliary electrode 140 is a L-shaped electrode.

Figure 6:
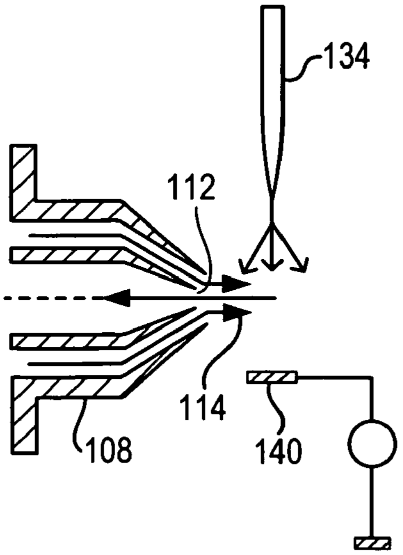
FIG. 6 depicts an embodiment according to the invention.
Figure 7:
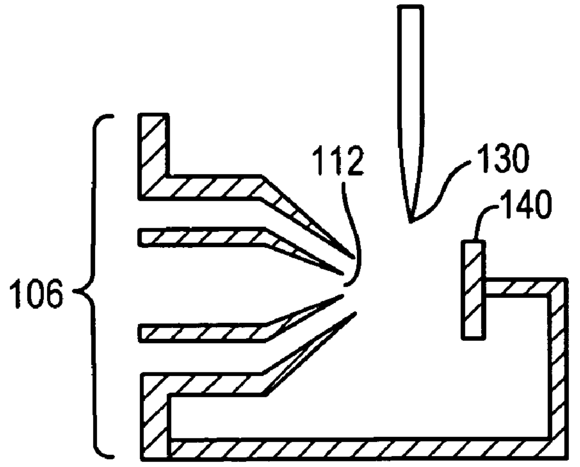
FIG. 7 depicts an embodiment according to the invention.
Figure 8:
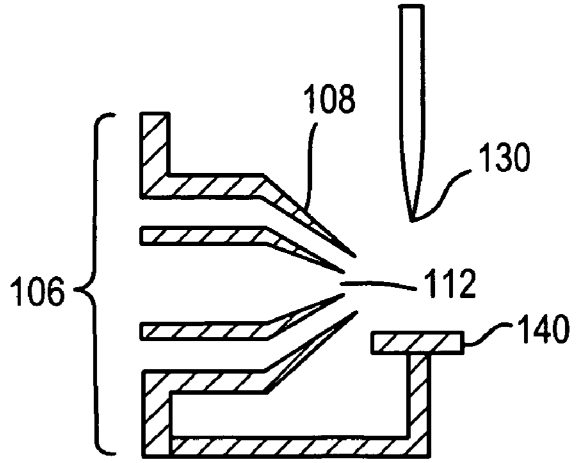
FIG. 8 depicts an embodiment according to the invention.

In a further embodiment, a planar auxiliary electrode 140 is placed perpendicular and opposite to the nozzle 134 as shown in FIG. 6. This arrangement produces an electrospray which is similar to the arrangement in FIG. 2. In one embodiment, the auxiliary electrode 140 is a circular plate with a diameter of 6 to 15 mm and more typically 8 to 10 mm, placed about 5 to 15 mm or more typically 6 to 10 mm away from the nozzle 134. The voltage applied to the auxiliary electrode 140 is preferably not more than +/−10% of the voltage on the inlet 112. For instance, −2000 V is applied to the inlet 112, the voltage applied to the auxiliary electrode 140 is preferably not higher than −1800 V or not lower than −2200 V. Since the voltage applied to the auxiliary electrode 140 is very close to that on the inlet 112, the auxiliary electrode 140 is electrically and mechanically directly connected to the interface 106 as an integrated element of the inlet 112 in other embodiments as shown in FIG. 7 and FIG. 8.

In some embodiments, the auxiliary electrode is disposed such that an angle of less than 15 degrees is subtended between the auxiliary electrode and the interface axis, said angle having its vertex at the inlet. In other embodiments, the auxiliary electrode is disposed such that an angle of less than 15 degrees is subtended between the auxiliary electrode and the nozzle axis, said angle having its vertex at the exit orifice.

The auxiliary electrode in some embodiments is a disk electrode; in other embodiments, the auxiliary electrode is a pin electrode; and in still other embodiments, the auxiliary electrode is an ‘L’ shaped electrode. In yet another embodiment, the auxiliary electrode has a convex cylindrical surface having a central axis, the central axis parallel to the nozzle axis.

The invention further provides a method of converting a liquid solute sample into ionized molecules. The method includes introducing a liquid solute sample into an apparatus according to the invention and applying an interface voltage to the interface and an auxiliary voltage to the auxiliary electrode. The applied interface voltage and auxiliary voltage are sufficient to subject the sample at the exit orifice and the inlet to an electric field, whereby the sample is discharged from the exit orifice in the form of droplets, the electric field effective to produce ionized molecules from the droplets and urge the ionized molecules towards the inlet. In particular embodiments, the method further includes applying a housing potential to the housing, wherein the voltage on the housing is about 80% to about 100% of the voltage on the inlet of the interface; in a particular embodiment, the voltage applied to the housing and the inlet is from the same voltage source, e.g. the interface source.

The practice of the present invention will employ, unless otherwise indicated, conventional techniques of synthetic organic chemistry, biochemistry, molecular biology, and the like, which are within the skill of the art. Such techniques are explained fully in the literature.

The Examples herein are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C. and pressure is at or near atmospheric. Standard temperature and pressure are defined as 20° C. and 1 atmosphere.

While the foregoing embodiments of the invention have been set forth in considerable detail for the purpose of making a complete disclosure of the invention, it will be apparent to those of skill in the art that numerous changes may be made in such details without departing from the spirit and the principles of the invention. Accordingly, the invention should be limited only by the following claims.

All patents, patent applications, and publications mentioned herein are hereby incorporated by reference in their entireties.

What is claimed is:

1. An electrospray apparatus, comprising:

a nozzle defining an exit orifice, an entrance orifice, and a first passage extending from the entrance orifice to the exit orifice, the nozzle defining a nozzle axis;

an interface defining an inlet, an outlet, and a second passage extending from the inlet to the outlet, the interface defining an interface axis; the interface disposed such that the inlet is adjacent the exit orifice and the interface axis is in transverse relation to the nozzle axis; wherein an angle formed between the nozzle axis and the interface axis is between about 75 degrees and about 105 degrees, the interface operable to receive a voltage from an interface voltage source;

an auxiliary electrode operable to receive a voltage from an auxiliary voltage source, the auxiliary electrode operable to modulate an electric field at the exit orifice and capable of being disposed in positions perpendicular and opposite to the nozzle, the electrospray apparatus operable to define an ion pathway followed by ions enroute from the exit orifice to the inlet, the auxiliary electrode disposed outside the ion pathway.

2. The electrospray apparatus of claim 1, wherein the interface further comprises a housing defining an opening disposed adjacent the inlet, the housing defining a lumen for transporting a gas, the lumen in fluid communication with the opening.

3. The electrospray apparatus of claim 2, the housing disposed such that the interface axis passes through the opening.

4. The electrospray apparatus of claim 2, wherein the housing is electrically conductive and is operable to receive a voltage from a housing voltage source.

5. The electrospray apparatus of claim 1, wherein the auxiliary electrode is disposed such that an angle of less than 15 degrees is subtended between the auxiliary electrode and the interface axis, said angle having its vertex at the inlet.

6. The electrospray apparatus of claim 5, wherein the distance between the exit orifice and the auxiliary electrode is greater than the distance between the inlet and the exit orifice.

7. The electrospray apparatus of claim 5, wherein the auxiliary electrode is disposed on the interface axis.

8. The electrospray apparatus of claim 1, wherein the auxiliary electrode is disposed such that an angle of less than 15 degrees is subtended between the auxiliary electrode and the nozzle axis, said angle having its vertex at the exit orifice.

9. The electrospray apparatus of claim 8, wherein the distance between the exit orifice and the auxiliary electrode is greater than the distance between the inlet and the exit orifice.

10. The electrospray apparatus of claim 8, wherein the auxiliary electrode is disposed on the nozzle axis.

11. The electrospray apparatus of claim 1, wherein a nozzle plane is defined that is perpendicular to the nozzle axis and intersects the nozzle axis at the exit orifice, wherein an interface plane is defined that is perpendicular to the interface axis and intersects the interface axis at the inlet, and wherein the auxiliary electrode is disposed on the downstream side of the nozzle plane and on the upstream side of the interface plane.

12. The electrospray apparatus of claim 1, wherein the auxiliary electrode is selected from a disk electrode, a pin electrode, and an 'L' shaped electrode.

13. The electrospray apparatus of claim 12, wherein the electrode is a disk electrode that has a diameter of at least about 5 mm and at most about 15 mm.

14. The electrospray apparatus of claim 1, wherein the auxiliary electrode has a convex cylindrical surface having a central axis, the central axis parallel to the nozzle axis.

15. The electrospray apparatus of claim 1, wherein the auxiliary electrode is in electrical communication with the interface such that the auxiliary voltage source is the interface voltage source.

16. The electrospray apparatus of claim 1, wherein the nozzle lacks any annular ring electrode disposed around the exit orifice.

17. A method of converting a liquid solute sample into ionized molecules, comprising:

introducing the liquid solute sample into the entrance orifice of an electrospray apparatus according to claim 1 to deliver the sample to the exit orifice;

applying an interface voltage to the interface, applying an auxiliary voltage to the auxiliary electrode, the auxiliary voltage in the range from about 50% to about 120% of the interface voltage, the voltages applied to the interface and to the auxiliary electrode sufficient to subject the sample at the exit orifice and the inlet to an electric field, whereby the sample is discharged from the exit orifice in the form of droplets, the electric field effective to produce ionized molecules from the droplets and urge the ionized molecules towards the inlet.

18. The method according to claim 17, wherein there is a potential difference in the range from 1 kV to 8 kV between the inlet and the exit orifice.

19. The method according to claim 17, wherein the interface voltage is in the range from 1 kV to –8 kV and the ionized molecules urged towards the inlet are positively charged.

20. The method according to claim 17, wherein the interface voltage is in the range from +1 kV to +8 kV and the ionized molecules urged towards the inlet are negatively charged.

21. A method of converting a liquid solute sample into ionized molecules, comprising:

introducing the liquid solute sample into the entrance orifice of an electrospray apparatus according to claim 4 to deliver the sample to the exit orifice, applying an interface voltage to the inlet of the interface, applying a housing voltage to the housing, the housing voltage in the range from about 80% to about 100% of the interface voltage, applying an auxiliary voltage to the auxiliary electrode, the auxiliary voltage in the range from about 50% to about 120% of the interface voltage, the voltages applied to the inlet of the interface, to the housing, and to the auxiliary electrode sufficient to subject the sample at the exit orifice and the inlet to an electric field, whereby the sample is discharged from the exit orifice in the form of droplets, the electric field effective to produce ionized molecules from the droplets and urge the ionized molecules towards the inlet.

22. The method according to claim 21, further comprising passing a drying gas through the lumen and out the opening such that the droplets encounter the drying gas.

23. The method according to claim 21, wherein there is a potential difference in the range from 1 kV to 8 kV between the inlet and the exit orifice.

24. The method according to claim 21, wherein the interface voltage is in the range from 1 kV to –8 kV and the ionized molecules urged towards the inlet are positively charged.

25. The method according to claim 21, wherein the interface voltage is in the range from +1 kV to +8 kV and the ionized molecules urged towards the inlet are negatively charged.

* * * * *